United States Patent
Anderson

(10) Patent No.: US 9,849,824 B2
(45) Date of Patent: Dec. 26, 2017

(54) CROSS SHUT GAP LIGHTING SOURCE

(71) Applicant: FORD GLOBAL TECHNOLOGIES, LLC, Dearborn, MI (US)

(72) Inventor: Ronald L. Anderson, Newport Beach, CA (US)

(73) Assignee: Ford Global Technologies, LLC, Dearborn, MI (US)

(*) Notice: Subject to any disclaimer, the term of this patent is extended or adjusted under 35 U.S.C. 154(b) by 141 days.

(21) Appl. No.: 14/938,550

(22) Filed: Nov. 11, 2015

(65) Prior Publication Data

US 2017/0129386 A1    May 11, 2017

(51) Int. Cl.
*B60Q 1/00* (2006.01)
*F21S 8/10* (2006.01)
*B60Q 1/30* (2006.01)

(52) U.S. Cl.
CPC .......... *B60Q 1/0011* (2013.01); *B60Q 1/0041* (2013.01); *B60Q 1/30* (2013.01); *F21S 48/1154* (2013.01); *F21S 48/1241* (2013.01); *F21S 48/1317* (2013.01); *F21S 48/145* (2013.01); *F21S 48/215* (2013.01); *F21S 48/2212* (2013.01); *F21S 48/2293* (2013.01); *F21S 48/23* (2013.01); *F21S 48/234* (2013.01)

(58) Field of Classification Search
CPC ...... B60Q 1/0011; B60Q 1/0041; B60Q 1/30; F21S 48/1154; F21S 48/1241; F21S 48/1317; F21S 48/145; F21S 48/215; F21S 48/2293; F21S 48/234; F21S 48/2212; F21S 48/23
See application file for complete search history.

(56) References Cited

U.S. PATENT DOCUMENTS

| | | | | |
|---|---|---|---|---|
| 5,422,792 A | * | 6/1995 | Neumann | B60Q 1/0011 362/284 |
| 5,685,628 A | | 11/1997 | Feger et al. | |
| 5,709,453 A | | 1/1998 | Krent et al. | |
| 5,771,326 A | * | 6/1998 | Fohl | B60Q 1/0011 362/551 |
| 5,857,770 A | | 1/1999 | Fohl et al. | |
| 5,918,973 A | * | 7/1999 | Nojiri | B60Q 1/0011 362/322 |
| 6,102,559 A | * | 8/2000 | Nold | B60Q 1/0011 340/468 |
| 7,086,765 B2 | | 8/2006 | Wehner | |
| 7,290,906 B2 | | 11/2007 | Suzuki et al. | |

* cited by examiner

*Primary Examiner* — Bao Q Truong
(74) *Attorney, Agent, or Firm* — Frank MacKenzie; Brooks Kushman P.C.

(57) ABSTRACT

A lighting system for a vehicle includes a light assembly having a light source and an optical guide configured to focus and direct light to an adjacent reflector assembly. The reflector assembly and the light assembly are separated by a gap. The reflector assembly includes passive elements, and a light collector aligned with the optical guide to receive light from the light source across the gap and to distribute light to the passive elements.

18 Claims, 2 Drawing Sheets

CROSS SHUT GAP LIGHTING SOURCE

TECHNICAL FIELD

This application generally relates to a lighting system that includes an active lighting component and a passive lighting component.

BACKGROUND

Under low-visibility conditions, a vehicle without any exterior lights may be difficult to see. Certain lights may be required by law to be present on the vehicle. Such lights may include taillights, headlights, turn signals, brake lights, and daytime running lights. A feature of these active lighting elements is that they convert electrical power into light. In addition to incorporating legally required lamps and reflectors, a manufacturer may desire to improve safety by adding additional lighting elements. Additional lamps add cost and complexity but may improve visibility. Another approach that has been taken is to incorporate various passive reflective elements to increase the apparent light area. The passive reflective elements may be designed to resemble the lights and are often located adjacent to the lights. However, the passive reflective elements depend upon a light source from another vehicle to appear illuminated.

SUMMARY

In some configurations, a vehicle includes a reflector assembly coupled to a first panel. The vehicle also includes a light assembly, coupled to a second panel and separated from the reflector assembly by a gap, including at least one light source and an optical guide configured to focus at least some light from the at least one light source into a beam that passes through a reflective channel defined by the optical guide and across the gap to the reflector assembly.

Some configurations may include one or more of the following features. The vehicle in which the first panel is movable relative to the second panel. The vehicle in which the at least one light source includes a light-emitting diode (LED). The vehicle in which one or more of the reflector assembly and the light assembly further includes a light shield configured to cover the gap in proximity to a light exit from the optical guide to reduce light leakage from the gap. The vehicle in which the at least one light source is disposed within the reflective channel. The vehicle in which the light assembly further includes a reflecting portion configured to reflect light from the at least one light source in a direction different than the beam. The vehicle in which the at least one light source includes a first light source configured to provide light for the optical guide and a second light source configured to provide light for the reflecting portion.

In some configurations, a vehicle includes a reflector assembly configured to receive a beam of light from a first direction and diffuse the beam of light in a second direction. The vehicle also includes a light assembly including a light source and an optical guide configured to focus light from the light source into the beam and direct the beam across a gap to the reflector assembly.

Some configurations may include one or more of the following features. The vehicle in which the light assembly further includes one or more optical elements configured to reflect and diffuse a portion of light from the light source in the second direction. The vehicle in which the light assembly further includes a second light source configured to provide light for the one or more optical elements. The vehicle in which the light source is one or more light emitting diodes (LED). The vehicle in which the optical guide further includes a reflective channel configured to guide light from the light source to a light exit of the optical guide. The vehicle in which one or more of the reflector assembly and the light assembly further includes a light shield configured to cover the gap in proximity to a light exit of the optical guide to reduce light leakage from the gap. The vehicle in which the light shield is formed of a resilient material.

In some configurations, a lighting system for a vehicle includes a light assembly including a light source, one or more optical elements configured to distribute light from the light source generally in a first direction, and an optical guide configured to focus light from the light source into a beam of light and direct the beam of light through a reflective channel defined by the optical guide in a second direction across a gap to a reflector assembly.

Some configurations may include one or more of the following features. The lighting system in which the light source includes one or more of a light emitting diode (LED), a discharge lamp, and a fluorescent lamp. The lighting system may include a light shield coupled to the lighting assembly and configured to reduce light leakage from the gap. The lighting system in which the light shield is formed of a resilient material. The lighting system in which the light shield surrounds an opening through which the beam of light exits the light assembly. The lighting system in which the light assembly further includes a second light source configured to provide light for the one or more optical elements.

DETAILED DESCRIPTION

Figure 1:
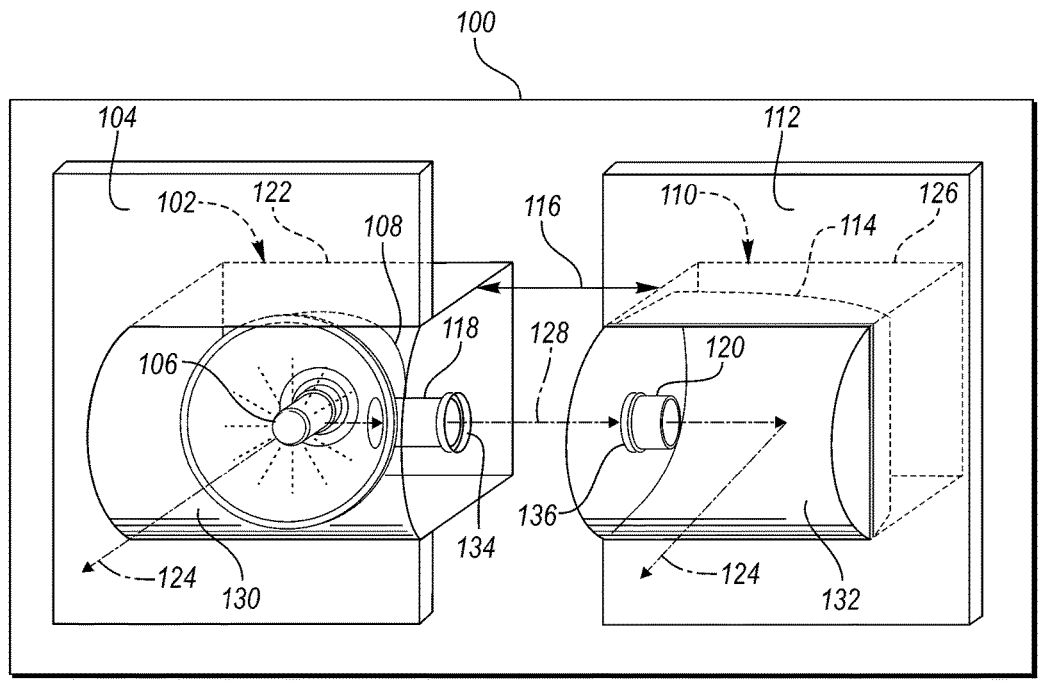
FIG. 1 is a possible lighting system configuration for a vehicle.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A vehicle may include a variety of lights to improve visibility of the surrounding environment for vehicle occupants. For example, headlights may illuminate an area in front of the vehicle allowing a driver to view the area in low-light conditions. The vehicle may include a variety of lights and reflectors to improve visibility of the vehicle to those in the surrounding environment. Taillights of the vehicle may alert drivers in other vehicles to the presence of the vehicle. In addition, the lights of the vehicle may be used to signal intent of the driver. For example, brake lights may be used to indicate that the vehicle is decelerating or stopped. Turn signal lamps may be used to indicate driver intent to turn in a direction indicated. Specific requirements for vehicle lighting may be determined by laws and regulations of government entities. The laws and regulations may specify the number, size, type, and location of required lights and reflectors.

Vehicle lighting components may be characterized as active lighting components or passive lighting components. Active lighting components refer to lighting elements that are illuminated by a light source on the vehicle, typically within a light fixture or assembly. Passive lighting components refer to lighting elements that are illuminated by a light source external to the vehicle, such as headlights of another vehicle, and reflect back. Note that active lighting elements may include reflective elements to disperse light from the vehicle-internal light source as well as reflective elements that are illuminated by external light sources.

In some vehicles, a passive lighting element may be placed in an articulating panel adjacent to an active lighting element to provide the appearance of a single lamp unit. This may be aesthetically pleasing under conditions in which the active lighting element is unlit. However, under conditions in which the active lighting element is illuminated, the passive lighting elements do not illuminate as brightly as the active lighting elements. Without an external light source, the passive elements may not illuminate at all. Persons viewing the lamp unit may notice uneven illumination across the lamp unit. This gives the appearance that the entire light is not functioning. A viewer may suspect that a lighting source in the passive lighting element is burned out.

In some situations, passive lighting components may be the only practical option. For example, a pickup truck includes a tailgate which opens and closes to provide access to the storage area of the truck. The tailgate is configured to pivot about an axis and may have a range of motion of approximately ninety degrees. To include an active lighting component on the tailgate would require a wiring harness or connection that could withstand many cycles of the tailgate opening and closing. Additionally, the tailgate may be removable which would require an electrical connection that could be easily connected and disconnected. Further, the tailgate is a harsh environment as various loads may be placed on the tailgate during loading and unloading of the truck. As such, passive lighting components are generally better suited than the active lighting components for tailgate applications.

Passive lighting components are generally designed to collect and reflect light that is received by the component. The passive lighting components are usually configured to reflect light in a same general direction from which the light was received. That is, incoming light is generally reflected back in the same direction as the light source.

A disadvantage of passive lighting components is that an external light source must be shining on the component in order to illuminate. Without an external source of light applied to the passive lighting component, no light may be visible from the component. Further, the visibility of the passive lighting component depends upon the intensity of light incident upon the component. This causes the light viewed from the passive lighting component to be inconsistent. To improve the function of passive lighting components, a light source from an adjacent active lighting element may be utilized.

FIG. 1 depicts a possible configuration of a lighting system for a vehicle. A vehicle 100 may include a plurality of body panels assembled to form a body of the vehicle 100. The body panels may include, but are not limited, to doors, fenders, trunks, hoods, and tailgates. Some body panels, such as fenders, may be configured to be fixed panels. Some body panels, such as doors, trunks, and tailgates, may be configured to move relative to the fixed panels and may be referred to as movable or articulating panels. The number and configuration of the body panels may depend upon the particular type of vehicle, such as truck, van, or hatchback sedan. To provide lighting for the vehicle, lighting assemblies may be coupled to one or more of the body panels.

The vehicle 100 may include an active lighting assembly 102. The active lighting assembly 102 may be coupled to a first panel 104. The active lighting assembly 102 may include one or more light sources 106. The light sources 106 may include, but is not limited to, incandescent bulbs, light-emitting diodes (LED), discharge lamps, and fluorescent lamps. The light sources 106 may convert electrical energy provided by a power source (e.g., battery and/or an alternator) into visible light. The light source 106 may be a replaceable bulb or light element. To facilitate easy installation and removal of the light source 106, the active lighting assembly 102 may include a socket or receptacle for receiving a replaceable bulb or light element. The receptacle may include electrical connections for coupling to the power source.

The active lighting assembly 102 may include one or more primary optical elements 108 to direct and disperse the light from the light source 106. The primary optical elements 108 may be reflective, refractive and/or diffusive elements. For example, the primary optical elements 108 may be configured to spread the light out over a larger area to increase the visible area of the active lighting assembly 102. The primary optical elements 108 may be shaped to concentrate or diffuse light from the light source 106. For some lighting applications such as taillights, a larger, dimmer light may be preferred over a concentrated, brighter beam of light.

The active lighting assembly 102 may also be configured to provide a specific color or frequency of light. In some applications, the light source 106 may be configured to provide light of the specific color. In some applications, the active lighting assembly 102 may include a lighting assembly lens cover 130 of the specific color. The lighting assembly lens cover 130 may be transparent and configured to allow light to pass through a face of the lighting assembly lens cover 130.

The active lighting assembly 102 may include a lighting assembly housing 122 configured to connect to the first panel 104. The receptacle, light sources 106, primary optical elements 108, and lighting assembly lens cover 130 may be configured for mounting within or on the lighting assembly housing 122. The lighting assembly housing 122 may include side panels and a back panel. One or more of the panels may define an opening for electrical wiring to enter the housing. In some configurations, the lens cover may be an integral part of the lighting assembly housing 122.

The light source 106 may be selectively electrically coupled to the power source. For example, the electrical coupling may be triggered by a switch operated by a driver. The electrical coupling may be triggered by a switch coupled to a brake pedal or turn signal lever. When the triggering source is activated, the light source 106 illuminates. That is, the light source 106 converts electrical energy into visible light. Light from the light source 106 then interacts with the primary optical elements 108 to provide the desired light pattern.

The active lighting assembly 102 may be configured to disperse light from the light source 106 in a first direction 124. The first direction 124 may be a direction generally perpendicular to a face of the lighting assembly lens cover 130. For example, a tail light or brake light may direct light toward the rear of the vehicle 100. The active lighting assembly 102 may be generally configured to focus light through the face of the lighting assembly lens cover 130. The dispersal may be at some range of angles from the lighting assembly lens cover 130.

The vehicle 100 may include a passive lighting assembly 110. The passive lighting assembly 110 does not include an active light source. The passive lighting assembly 110 may be configured to reflect light that shines upon the passive lighting assembly 110. The passive lighting assembly 110 may include a passive assembly housing 126 configured to couple to the second panel 112. The second panel 112 may be a movable panel such as a door, hatch, trunk, or tailgate. The passive lighting assembly 110 may include one or more secondary optical elements 114 to reflect light. The passive lighting assembly 110 may include a diffusive lens cover 132. The color of the diffusive lens cover 132 may be such that it matches a color of an adjacent lighting assembly lens cover 130. When the second panel 112 is in a closed position, the active lighting assembly 102 and the passive lighting assembly 110 may appear to an observer as a single unit. A gap 116 may be defined between a side of the active lighting assembly 102 and a corresponding side of the passive lighting assembly 110. Note that the size of the gap 116 depicted in FIG. 1 is exaggerated in order to depict the components more clearly. In practice, the size of the gap 116 may be minimized.

The source of light for a typical passive lighting component is light that enters through the lens cover. Light entering through the lens cover may be reflected by the optical elements. As such, the passive lighting component only appears to be illuminated when light from a source external to the vehicle is shining on the lens cover. The passive lighting component may only be visible when the external light source is close enough to the passive element to provide light. Further, the intensity of the light reflected from the passive lighting component may be proportional to the intensity of light incident upon the passive lighting component from the external light source. An observer may notice a change in intensity of the reflected light as the external light source moves relative to the vehicle 100.

A preferred configuration may be one in which the passive lighting assembly 110 is illuminated by a more consistent source of light. In this way, the passive lighting assembly 110 may provide a more consistent light intensity and be more visible to other drivers. To better illuminate the passive lighting assembly 110, light from the light source 106 in the adjacent active lighting assembly 102 may be directed through the gap 116 to the passive lighting assembly 110. Changes may be made to both the active lighting assembly 102 and the passive lighting assembly 110 to achieve this.

The active lighting assembly 102 may be modified to direct some of the light from the light source 106 to the passive lighting assembly 110. In some configurations, this may be achieved by a focusing element or optical/light guide 118. The focusing element 118 may include one or more lenses and/or one or more refractive elements. The focusing element 118 may function by collecting and channeling at least a portion of the light provided by the light source 106 and concentrating the light into a beam that may be directed across the gap 116 between the active lighting assembly 102 and the passive lighting assembly 110. The focusing element 118 may include a channel or tube of reflective material to guide the light toward the gap 116. The focusing element 118 may include angles and bends configured to guide light toward a light exit 134. The light exit 134 may be an opening on a side of the active lighting assembly housing 122 that is adjacent the gap 116.

The light guide 118 may be comprised of a channel or tube of reflective material. A measure of a fraction of energy that is reflected by a surface may be referred to as the reflectivity of the surface. The surface of the light guide 118 that is exposed to light from the light source 106 may have a reflectivity of approximately one. This means that most or all of the energy is reflected along the surface. For example, a smooth, mirrored surface may have the desired reflectivity. Further, the light guide 118 may be further configured so that light exiting the light guide 118 at the light exit 134 forms a concentrated or narrow beam of light. For example, the light guide 118 may include a convex lens near the light exit 134 to focus the beam of light through the light exit 134. In some configuration, the light guide 118 may include a convex lens near the light source 106 to focus light into the reflective channel defined by the light guide 118.

In some configurations, the light guide 118 may be a hollow structure with mirrored surfaces on an interior portion. In some configuration, the light guide 118 may be a solid structure configured to transmit light through the body of the structure.

The focusing element 118 may be configured to direct light in a second direction 128 that is different than the first direction. In some configurations, the second direction 128 may be generally perpendicular to the first direction 124. The second direction 128 may be generally perpendicular to the face of the lighting assembly lens cover 130.

The passive lighting assembly 110 may be configured to include a light receptor or light collector 120 located opposite the light exit 134 of the focusing element 118 of the active lighting assembly 102. A light collector entrance 136 may be defined on a side of the passive lighting assembly housing 126 that is adjacent to the active lighting assembly 102. The light collector entrance 136 may be located directly across the gap 116 from the light exit 134. The light collector 120 may include one or more lenses and/or one or more refractive elements. The light collector 120 may include a tube or channel of reflective material configured to permit light to travel from the light collector entrance 136 to the secondary optical elements 114. The light collector 120 may be configured with angles and bends to facilitate the transport of light within the passive lighting assembly 110.

The light collector 120 may be similar in configuration to the light guide 118. The light collector 120 may be comprised in part of a channel or tube of reflective material. The light collector 120 may receive the beam of light at the light collector entrance 136 and channel the beam to the passive lighting assembly 110. At an end of the light collector 120 that is opposite the light collector entrance 136, the beam may be dispersed to the secondary optical elements 114. For example, a concave lens may be placed near the end to spread light in a broader beam. In some configurations, the end may be shaped such that the beam is reflected at different angles.

The secondary optical elements 114 of the passive lighting assembly 110 may be configured to receive light from the light collector 120. The secondary optical elements 114 may interact with light from the light collector 120 to distribute the light through the diffusive lens cover 132. Such a configuration gives the appearance that the passive lighting assembly 110 has an active light source. The light emanating from the passive lighting assembly 110 may be more consistent and visible from greater distances without external light being applied. The resulting lighting system provides a more expensive looking lighting configuration with minimum extra cost. Additional cost of providing electrical power to the second panel 112 in which the passive lighting assembly 110 is mounted is avoided.

Figure 2:
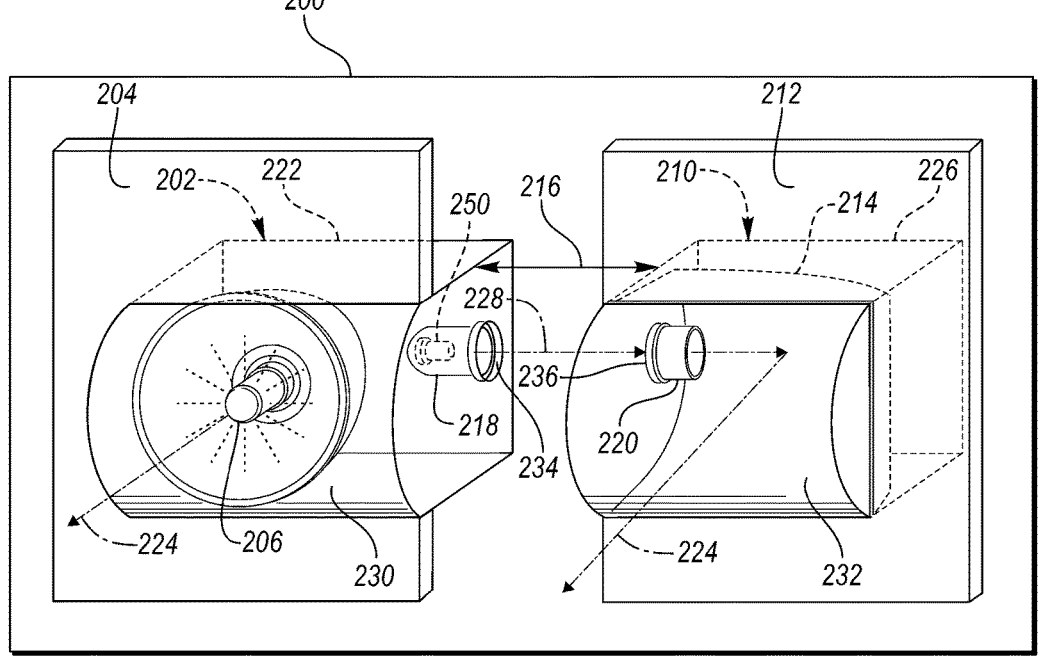
FIG. 2 is a possible configuration for a dual-source active lighting assembly.

FIG. 2 depicts a configuration for a multiple light source active lighting assembly 202 for a vehicle 200. Note that similarly numbered features (e.g., 106 and 206) between FIG. 1 and FIG. 2 may function in a similar manner and the descriptions associated with the similarly numbered features are applicable. The vehicle 200 may include an active lighting assembly 202 that is coupled to a first panel 204. The vehicle 200 may include a passive lighting assembly 210 that is coupled to a second panel 212 and separated from the active lighting assembly 202 by a gap 216. The active lighting assembly 202 may include an active lighting assembly housing 222. Coupled to the active lighting assembly housing 222 may be a light source 206 and one or more primary optical elements 208 to provide light in a first direction 224. An active lighting lens cover 230 may be coupled to the active lighting assembly housing 222. The passive lighting assembly 210 may include a passive lighting assembly housing 226. Coupled to the passive lighting assembly housing 226 may be one or more secondary optical elements 214 and a diffusive lens cover 232. The passive lighting assembly 210 may include a light collector 220 that receives light through a light collector entrance 236.

In some configurations, a second light source 250 may be provided that is configured to direct light across the gap 216 to the passive lighting assembly 210. A light channel 218 may be configured to focus and channel light from the second light source 250 through a light exit 234 to the passive lighting assembly 210. The second light source 250 may be integrated with the alternative light channel 218 to optimize transmission of light through the gap 216. The light channel 218 may be a tube of reflective material with appropriate angles and bends to direct light to the desired location. In some configurations, the second light source 250 may be located directly adjacent the light exit 234. In such configurations, the light channel 218 may be eliminated. An advantage of the multiple light source active lighting assembly 202 is that there are separate light sources (206 and 250) which provide some redundancy in the lighting. For example, should one of the light sources (206 or 250) fail, the other may still function and provide the desired light signal. Further, greater light intensity may be transferred to the passive lighting assembly 210 since the second light source 250 may be optimally placed relative to the light channel 218 to transmit a maximum amount of light across the gap 216.

Further variations on the multiple light source active lighting assembly 202 are possible. For example, additional light sources and light channels may be present to direct light across the gap 216. The passive lighting assembly 210 may be configured with associated light collectors to collect the light from each of the light channels. The passive lighting assembly 210 may be configured to channel the light to a single secondary optical element or may channel the light to separate secondary optical elements depending upon the application. Further variations may include directing light in more than one direction across more than one gap. For example, in a taillight assembly, light may be transferred in a first direction to a tailgate reflector assembly and in an opposite direction to a side light reflector assembly.

Figure 3:
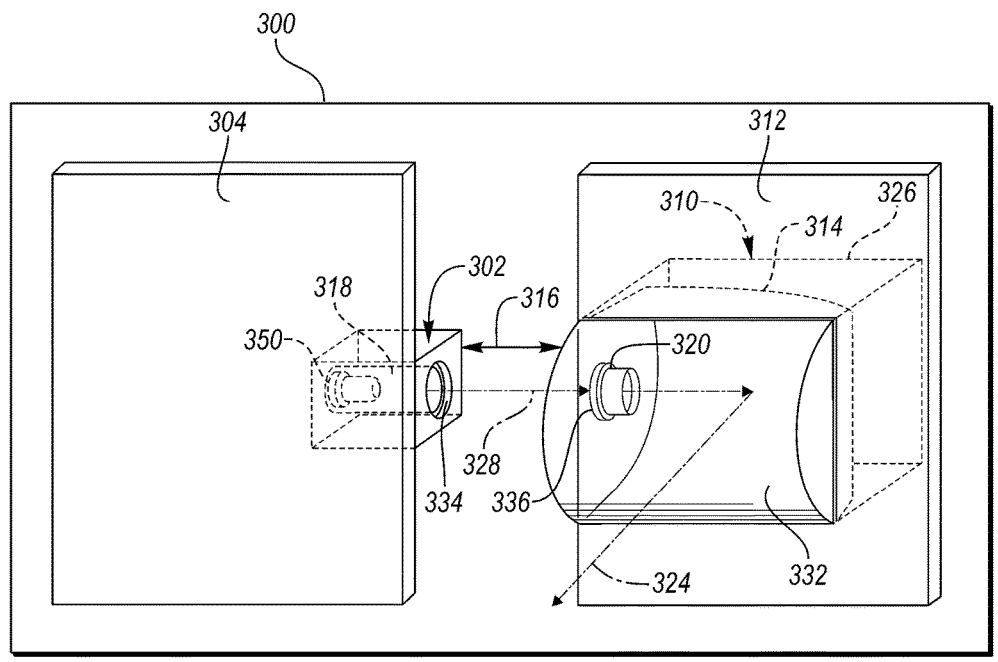
FIG. 3 is a possible configuration for a hidden active lighting assembly.

FIG. 3 depicts a vehicle 300 including a hidden active lighting assembly 302. Again, similarly numbered features (e.g., 120 and 320) between FIG. 1 and FIG. 3 may function in a similar manner and the descriptions associated with the similarly numbered features are applicable. The hidden active lighting assembly 302 may be coupled to a first panel 304. The vehicle 300 may include a passive lighting assembly 310 that is coupled to a second panel 312 and separated from the hidden active lighting assembly 302 by a gap 316. The passive lighting assembly 310 may include a passive lighting assembly housing 326. Coupled to the passive lighting assembly housing 326 may be one or more secondary optical elements 314 and a diffusive lens cover 332. The passive lighting assembly 310 may include a light collector 320 that receives light through a light collector entrance 336.

The hidden active lighting assembly 302 may be configured to provide light only for the passive lighting assembly 310. For example, the hidden active lighting assembly 302 may include a hidden light source 350 and an associated focusing element 318 for focusing and directing light across the gap 316 through a light exit 334. In some configurations, the hidden light source 350 may be adjacent the light exit 334 eliminating the need for the associated focusing element 318. The hidden active lighting assembly 302 may be configured to be installed within a cavity or between body panels. The hidden active lighting assembly 302 may not be directly visible by an observer. However, when the hidden light source 350 is activated, the associated passive lighting assembly 310 will be illuminated. This configuration may be useful for transmitting light from a panel that has power with no external lighting requirement to a panel that does not have power with an external lighting requirement. Applications may include illuminating a badge or logo in a non-powered panel.

The resulting lighting system may find use in applications in which lighting is desired in a panel without having to route wiring to the panel. For example, a body panel may include a brand badge that is desired to be illuminated. Other applications include illuminating passive lighting assemblies in a tailgate of a pickup truck or a trunk of a car. Other examples may include providing a light source in a door panel to provide light for lighting elements on a fender. As power may be routed to the door, such a configuration may reduce the need to route power cables to the fender.

An additional benefit of the lighting system described may be found in applications in which the passive lighting assembly 110 is movable relative to the active lighting assembly 102, referring again to FIG. 1. For example, when the active lighting assembly 102 is located on the rear panel of the vehicle 100 and the passive lighting assembly 110 is located on a trunk lid. When the lights are in the on state, both the active lighting assembly 102 and the passive lighting assembly 110 will be illuminated. When the trunk is opened, the passive lighting assembly 110 will no longer be illuminated. However, light from the light guide 118 of the active lighting assembly 102 may provide illumination of trunk area. When the trunk lid is closed again, the light is then received by the passive lighting assembly 110 to illuminate the passive lighting assembly 110. A similar benefit is present in pickup trucks in which the passive lighting assembly 110 is mounted on a tailgate.

Figure 4:
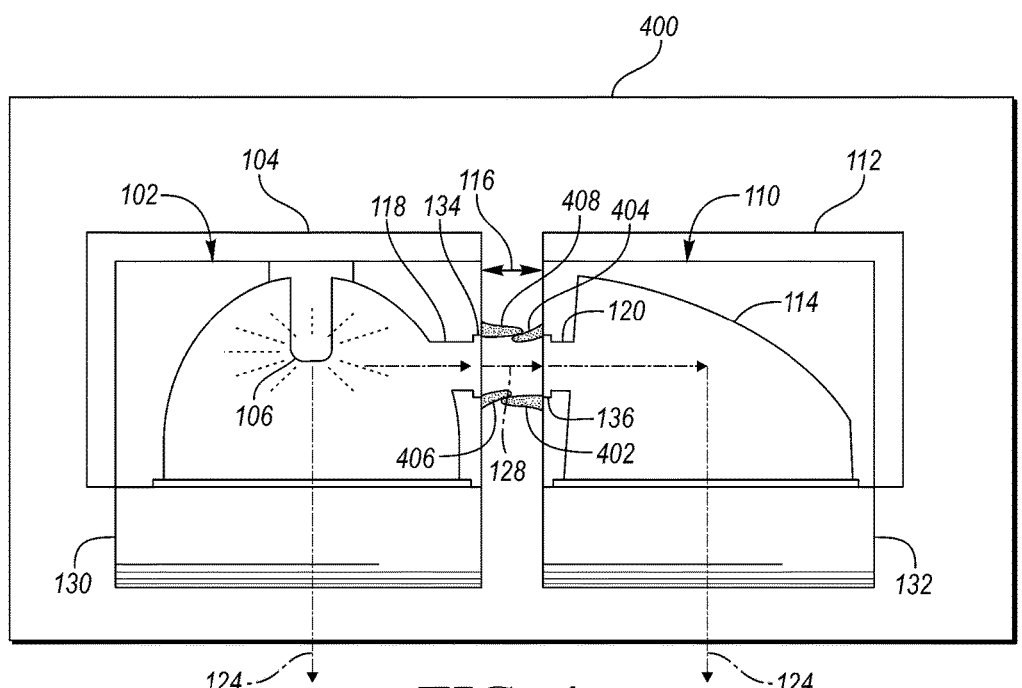
FIG. 4 is a possible configuration for a light shield.

In some configurations, light exiting the focusing element 118 of the active lighting assembly 102 may leak into the gap 116. The result may be that the gap 116 appears to be illuminated. To reduce or eliminate illumination of the gap 116, a light shield may be employed. FIG. 4 depicts a top view of a possible vehicle configuration 400 that includes a light shield. The light shield may be comprised of one or more light shield elements 406, 408 coupled to the active lighting assembly 102 and one or more light shield elements 402, 404 coupled to the passive lighting assembly 110.

In some configurations, the light shield elements 402, 404, 406, 408 may be a ridge of non-transparent material that is installed on the active lighting assembly 102 and/or the passive lighting assembly 110. The light shield elements 402, 404, 406, 408 may be formed of a resilient material, such as rubber. The light shield elements 402, 404, 406, 408 may extend into the gap 116. When installed on the active lighting assembly 102, a first light shield element 406 may be located in a region between the light exit 134 and the lighting assembly lens cover 130. When installed on the passive lighting assembly 110, a second light shield element 402 may be located in a region between the light collector entrance 136 and the diffusive lens cover 132. That is, the first and second light shield elements 406, 402 may be placed between the light path between assemblies and an external viewer.

In some configurations, a third light shield element 408 may be coupled to the active lighting assembly 102 in a region between the light exit 134 and the back panel of the active lighting assembly 102. A fourth light shield element 404 may be coupled to the passive lighting assembly 110 in a region between the light collector entrance 136 and the back panel of the passive lighting assembly 110. In some configurations, the light shield elements may extend completely around the light exit 134 and/or the light collector entrance 136. In some configurations, the light shield elements 402, 406 may extend partially around the light exit 134 and/or the light collector entrance 136.

The first light shield element 406 may extend around the light exit 134. A length of the first light shield element 406 may increase as a distance from the lighting assembly lens cover 130 increases. The second light shield element 402 may extend around the light entrance 136. A length of the second light shield element 402 may decrease as a distance from the diffusive lens cover 132 increases. The first light shield element 406 and the second light shield element 402 may be configured to be in contact with one another when the second panel 112 is in a closed position relative to the first panel 104. In some configurations, the light shield elements 406, 402 may have a reflective layer on an inner surface to prevent absorption of the light energy by the light shield elements 406, 402. An outer surface of the light shield elements 406, 402 may be colored to match surrounding surfaces. As the light shield elements 406, 402 may be located in the gap 116, the exterior surface may be a dark color, such as black.

In some configurations, the light shield may be implemented as a gasket that fills the gap 116 between the first body panel 104 and the second body panel 112. The gasket may be installed on one or both of the body panels.

The lighting system disclosed enhances the appearance of the vehicle. Lighting from passive components may appear uniformly illuminated under varied lighting conditions. The lighting system enhances visibility of the vehicle leading to improved safety and compliance with lighting regulations. In addition, the enhancements are achieved with minimal extra cost and complexity. The lighting system eliminates the need for additional wiring harnesses.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a reflector assembly coupled to a first panel;
   a light assembly, coupled to a second panel and separated from the reflector assembly by a gap, including at least one light source and an optical guide configured to focus at least some light from the at least one light source into a beam that passes through a reflective channel defined by the optical guide and across the gap to the reflector assembly; and
   a light shield coupled to one or more of the reflector assembly and the light assembly configured to cover the gap in proximity to a light exit from the optical guide to reduce light leakage from the gap.

2. The vehicle of claim 1 wherein the first panel is movable relative to the second panel.

3. The vehicle of claim 1 wherein the at least one light source includes a light-emitting diode (LED).

4. The vehicle of claim 1 wherein the at least one light source is disposed within the reflective channel.

5. The vehicle of claim 1 wherein the light assembly further includes a reflecting portion configured to reflect light from the at least one light source in a direction different than the beam.

6. The vehicle of claim 5 wherein the at least one light source includes a first light source configured to provide light for the optical guide and a second light source configured to provide light for the reflecting portion.

7. A vehicle comprising:
a reflector assembly configured to receive a beam of light from a first direction and diffuse the beam of light in a second direction; and
a light assembly including a light source and an optical guide configured to focus light from the light source into the beam and direct the beam through a light exit across a gap covered by a light shield to reduce light leakage to the reflector assembly.

8. The vehicle of claim 7 wherein the light assembly further includes one or more optical elements configured to reflect and diffuse a portion of light from the light source in the second direction.

9. The vehicle of claim 8 wherein the light assembly further includes a second light source configured to provide light for the one or more optical elements.

10. The vehicle of claim 7 wherein the light source is one or more light emitting diodes (LED).

11. The vehicle of claim 7 wherein the optical guide further includes a reflective channel configured to guide light from the light source to a light exit of the optical guide.

12. The vehicle of claim 7 wherein the light shield is disposed on one or more of the reflector assembly and the light assembly.

13. The vehicle of claim 7 wherein the light shield is formed of a resilient material.

14. A lighting system for a vehicle comprising:
a light assembly including a light source, one or more optical elements configured to distribute light from the light source generally in a first direction, an optical guide configured to focus light from the light source into a beam of light and direct the beam of light through a reflective channel defined by the optical guide in a second direction across a gap to a reflector assembly, and a second light source configured to provide light for the one or more optical elements.

15. The lighting system of claim 14 wherein the light source includes one or more of a light emitting diode (LED), a discharge lamp, and a fluorescent lamp.

16. The lighting system of claim 14 further comprising a light shield coupled to the lighting assembly and configured to reduce light leakage from the gap.

17. The lighting system of claim 16 wherein the light shield is formed of a resilient material.

18. The lighting system of claim 16 wherein the light shield surrounds an opening through which the beam of light exits the light assembly.

* * * * *